(12) United States Patent
Yamanaka et al.

(10) Patent No.: US 10,865,491 B2
(45) Date of Patent: *Dec. 15, 2020

(54) SN-BASED ALLOY PLATED STEEL SHEET

(71) Applicant: NIPPON STEEL & SUMITOMO METAL CORPORATION, Tokyo (JP)

(72) Inventors: Shintaro Yamanaka, Tokyo (JP); Shigeru Hirano, Tokyo (JP); Morio Yanagihara, Tokyo (JP); Hirokazu Yokoya, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 95 days.

This patent is subject to a terminal disclaimer.

(21) Appl. No.: 16/302,903

(22) PCT Filed: May 24, 2017

(86) PCT No.: PCT/JP2017/019436
§ 371 (c)(1),
(2) Date: Nov. 19, 2018

(87) PCT Pub. No.: WO2017/204266
PCT Pub. Date: Nov. 30, 2017

(65) Prior Publication Data
US 2019/0292673 A1    Sep. 26, 2019

(30) Foreign Application Priority Data
May 24, 2016  (JP) ................... 2016-103381

(51) Int. Cl.
*B32B 15/01*    (2006.01)
*C25D 3/60*    (2006.01)
(Continued)

(52) U.S. Cl.
CPC ............. *C25D 3/60* (2013.01); *C25D 5/12* (2013.01); *C25D 5/48* (2013.01); *C25D 5/50* (2013.01);
(Continued)

(58) Field of Classification Search
None
See application file for complete search history.

(56) References Cited

U.S. PATENT DOCUMENTS 4,601,957 A * 7/1986 Fujimoto ............... C25D 5/12
205/111
4,999,258 A    3/1991 Wake et al.
(Continued)

FOREIGN PATENT DOCUMENTS

CN    105358737 A    2/2016
JP    63-290292 A    11/1988
(Continued)

OTHER PUBLICATIONS

Nayral et al., "Synthesis of Tin and Tin Oxide Nanoparticles of Low Size Dispersity for Application in Gas Sensing", 2000, Chem. Eur. J., vol. 6, pp. 4082-4090 (Year: 2000).*
(Continued)

*Primary Examiner* — Seth Dumbris
(74) *Attorney, Agent, or Firm* — Birch, Stewart, Kolasch & Birch, LLP (57) ABSTRACT

The Sn-based alloy plated steel sheet of this disclosure includes: a steel sheet; a composite plating layer formed on at least one side of the steel sheet and including an Fe—Ni—Sn alloy layer and an island-shaped Sn layer located on the Fe—Ni—Sn alloy layer; and a coating layer formed on the surface of the composite plating layer and containing zirconium oxide and tin oxide, and the composite plating layer contains a predetermined amount of Ni and a predetermined (Continued)

amount of Sn, a content of the zirconium oxide in the coating layer is from 0.2 mg/m² to 50 mg/m² in terms of metal Zr amount, and a peak position of binding energy of $Sn3d_{5/2}$ according to X-ray photoelectron spectroscopy of the tin oxide in the coating layer is 1.6 eV or higher than a peak position of binding energy of the metal Sn.

4 Claims, 1 Drawing Sheet

(51) Int. Cl.
    *C25D 5/48*      (2006.01)
    *C25D 11/34*    (2006.01)
    *C25D 5/50*      (2006.01)
    *C25D 9/08*      (2006.01)
    *C25D 9/06*      (2006.01)
    *C25D 7/06*      (2006.01)
    *C25D 5/12*      (2006.01)
    *C25D 3/12*      (2006.01)
    *C25D 3/32*      (2006.01)

(52) U.S. Cl.
    CPC ............ *C25D 7/0614* (2013.01); *C25D 9/06* (2013.01); *C25D 9/08* (2013.01); *C25D 11/34* (2013.01); *C25D 3/12* (2013.01); *C25D 3/32* (2013.01); *Y10T 428/12722* (2015.01)

(56) References Cited

U.S. PATENT DOCUMENTS

| | | | |
|---|---|---|---|
| 2010/0119867 A1 | 5/2010 | Date | |
| 2013/0089751 A1* | 4/2013 | Hirano | C25D 3/54 |
| | | | 428/648 |

FOREIGN PATENT DOCUMENTS

| | | | | |
|---|---|---|---|---|
| JP | 2004-60052 A | | 2/2004 | |
| JP | 2007-284789 A | | 11/2007 | |
| JP | 2009-249691 A | | 10/2009 | |
| JP | 2009249691 | * | 10/2009 | ............ C23C 28/00 |
| JP | 2010-13728 A | | 1/2010 | |
| JP | 2010-202971 A | | 9/2010 | |
| JP | 2011-174172 A | | 9/2011 | |
| JP | 2014-88587 A | | 5/2014 | |
| KR | 10-2016-0013990 A | | 2/2016 | |
| WO | WO 2008/123632 A1 | | 10/2008 | |
| WO | WO 2015/001598 A1 | | 1/2015 | |
| WO | WO2015001598 | * | 1/2015 | ............ C23C 22/07 |

OTHER PUBLICATIONS

International Search Report for PCT/JP2017/019436 dated Jul. 11, 2017.
The Surface Science Society of Japan, "Library of Surface Analysis Technologies X-Ray Electron Spectrometry", Maruzen Inc., Jul. 5, 1998, p. 83, total 8 pages.
Written Opinion of the International Searching Authority for PCT/JP2017/019436 (PCT/ISA/237) dated Jul. 11, 2017.
Korean Office Action, dated Feb. 20, 2020, for corresponding Korean Application No. 10-2018-7032075, with a partial English translation.
Chinese Office Action for corresponding Chinese Application No. 201780030385.8, dated Nov. 22, 2019, with English translation.
Ariga et al., "Applications of X-ray Photoelectron Spectroscopy for Surface Treatment", The Metal Finishing Society of Japan, 1976, vol. 27, No. 1, pp. 7-14 (8 pages).
Japanese Office Action, dated Jan. 7, 2020, for corresponding Japanese Application No. 2018-519587, with an English translation.
Indian Examination Report, dated Oct. 17, 2019, for corresponding Indian Application No. 201817042633, with an English translation.

* cited by examiner

SN-BASED ALLOY PLATED STEEL SHEET

TECHNICAL FIELD

The present disclosure relates to an Sn-based alloy plated steel sheet.

BACKGROUND ART

Sn (tin)-based alloy plated steel sheets are widely used as steel sheets for containers such as beverage cans and food cans. This is because Sn is safe for the human bodies and is a beautiful metal. In this Sn-based alloy plated steel sheet, in order to secure adhesion between a steel sheet and a coating film and corrosion resistance and to suppress appearance change (yellowing) accompanying tin oxide growth during storage prior to coating, a chromate coating is often applied on an Sn-based alloy plating layer by a chromate treatment such as an electrolytic treatment or a dipping treatment using a solution of hexavalent chromate.

On the other hand, in recent years, due to increased environmental awareness and safety awareness, it is demanded not only that final products do not contain hexavalent chromium, but also that a chromate treatment itself is not performed. However, as described above, in an Sn-based alloy plated steel sheet without a chromate film, due to growth of tin oxide, the appearance turns yellow and the lacquer adhesion deteriorates.

For this reason, several Sn-plated steel sheets or Sn-based alloy plated steel sheets subjected to coating treatment in place of a chromate film have been proposed.

For example, the following Patent Document 1 proposes an Sn-plated steel sheet in which a film containing P and Si is formed by a treatment using a solution containing a phosphate ion and a silane coupling agent.

The following Patent Document 2 proposes an Sn-based alloy plated steel sheet in which a film containing a reactant of Al and P, at least one of Ni, Co, and Cu, and a silane coupling agent is formed by a treatment using a solution containing aluminum phosphate.

The following Patent Document 3 proposes a method of manufacturing an Sn-plated steel sheet having no chromate coating, in which, after Zn plating on an Sn plating layer, a heat treatment is performed until the Zn plating layer is disappeared.

The following Patent Document 4 and Patent Document 5 propose Sn-based alloy plated steel sheets (steel sheets for containers) having a chemical conversion treatment film containing zirconium, phosphoric acid, a phenol resin, and the like.

The following Patent Document 6 proposes Sn-plated steel sheets or Sn-based alloy plated steel sheets (steel sheets for containers) including an Sn plating layer and a chemical conversion treatment layer containing tin oxide and tin phosphate formed by forming an Sn plating layer and performing a cathodic electrolytic treatment and then an anodic electrolytic treatment in a phosphate aqueous solution.

The following Patent Document 7 proposes Sn-plated steel sheets or Sn-based alloy plated steel sheets (steel sheets for containers) including a coating containing tin oxide and Zr, Ti, and P. Patent Document 6 proposes that alternating electrolysis in which a cathode electrolysis process and an anodic electrolytic treatment are performed alternately may be performed when forming a coating film.

The following Patent Document 8 proposes Sn-plated steel sheets or Sn-based alloy plated steel sheets (steel sheets for containers) including Zr and Si. Patent Document 8 proposes that alternating electrolysis in which a cathodic electrolytic treatment and an anodic electrolytic treatment are performed alternately may be performed when forming a coating film.

Patent Document 1: Japanese Patent Application Laid-Open (JP-A) No. 2004-60052
Patent Document 2: JP-A No. 2011-174172
Patent Document 3: JP-A No. S63-290292
Patent Document 4: JP-A No. 2007-284789
Patent Document 5: JP-A No. 2010-13728
Patent Document 6: JP-A No. 2009-249691
Patent Document 7: WO 2015/001598
Patent Document 8: JP-A No. 2014-88587
Non Patent Document 1: "Surface Analysis Techniques Selection: X-ray Photoelectron Spectroscopy" edited by The Surface Science Society of Japan, Maruzen Inc., p. 83

SUMMARY OF INVENTION

Problems to be Solved by the Invention

However, in the Sn-based alloy plated steel sheet and the manufacturing method thereof proposed in Patent Documents 1 to 8, growth of tin oxide is not sufficiently suppressed over time, and the yellow stain resistance, the lacquer adhesion, and the sulphide stain resistance are deteriorated, which has been problematic.

Accordingly, the invention has been made in view of the above problems, and an object of one aspect of the disclosure is to provide an Sn-based alloy plated steel sheet which is more excellent in the yellow stain resistance, the lacquer adhesion, and the sulphide stain resistance without performing conventional chromate treatment.

Means for Solving the Problems

Means for solving the above-described problems includes the following aspects.

(1) An Sn-based alloy plated steel sheet comprising:
a steel sheet;
a composite plating layer formed on at least one side of the steel sheet and including an Fe—Ni—Sn alloy layer and an island-shaped Sn layer located on the Fe—Ni—Sn alloy layer; and
a coating layer formed on the surface of the composite plating layer and containing zirconium oxide and tin oxide,
wherein the composite plating layer contains, from 2 mg/m$^2$ to 200 mg/m$^2$ of Ni in terms of metal Ni converted amount and from 0.1 g/m$^2$ to 10 g/m$^2$ of Sn in terms of metal Sn converted amount,
a content of the zirconium oxide in the coating layer is from 0.2 mg/m$^2$ to 50 mg/m$^2$ in terms of metal Zr amount, and
a peak position of binding energy of Sn3d$_{5/2}$ according to X-ray photoelectron spectroscopy of the tin oxide in the coating layer is 1.6 eV or higher than a peak position of binding energy of the metal Sn.

(2) The Sn-based alloy plated steel sheet according to claim 1, wherein a thickness of the coating layer is from 2 nm to 100 nm.

(3) The Sn-based alloy plated steel sheet according to claim 1 or 2, wherein the coating layer further contains phosphorus and a P amount/a metal Zr amount is from 0.2 to 1 in terms of mass ratio per unit area.

Effects of the Invention

As described above, according to the disclosure, it is possible to provide an Sn-based alloy plated steel sheet with further improved yellow stain resistance, lacquer adhesion, and sulphide stain resistance without performing conventional chromate treatment.

DESCRIPTION OF EMBODIMENTS

Hereinafter, the disclosure will be described in detail.

Herein, the numerical range expressed by using "to" means a range including numerical values described before and after "to" as a lower limit value and an upper limit value.

Herein, the term "process" is included in this term as long as the intended purpose of the process can be achieved not only in an independent process but also in a case where it cannot be clearly distinguished from other processes.

Herein, the term "steel sheet" means a parent steel sheet (so-called plating original sheet) to be formed with a composite plating layer and a coating layer.

The disclosure, which will be described below, relates to a steel sheet for containers widely used for cans such as food cans and beverage cans and the like, and a method of manufacturing such a steel sheet for containers. More specifically, the invention relates to an Sn-based alloy plated steel sheet and an Sn-based alloy plated steel sheet which are more excellent in the yellow stain resistance, the lacquer adhesion, and the sulphide stain resistance without performing conventional chromate treatment.

Specifically, the Sn-based alloy plated steel sheet of the disclosure includes: a steel sheet; a composite plating layer formed on at least one side of the steel sheet and including an Fe—Ni—Sn alloy layer and an island-shaped Sn layer located on the Fe—Ni—Sn alloy layer; and a coating layer formed on the surface of the Sn-based alloy plating layer and containing zirconium oxide and tin oxide.

More specifically, in the Sn-based alloy plated steel sheet of the disclosure, the composite plating layer contains, from 2 mg/m$^2$ to 200 mg/m$^2$ of Ni in terms of metal Ni converted amount and from 0.1 g/m$^2$ to 10 g/m$^2$ of Sn in terms of metal Sn converted amount. The content of the zirconium oxide in the coating layer is from 0.2 mg/m$^2$ to 50 mg/m$^2$ in terms of metal Zr amount. The peak position of binding energy of Sn3d$_{5/2}$ according to X-ray photoelectron spectroscopy of the tin oxide in the coating layer is 1.6 eV or higher than the peak position of binding energy of the metal Sn.

<Regarding Steel Plate>

The steel sheet is not specifically defined, and any steel sheet can be used as long as the sheet is a steel sheet used for general Sn-based alloy plated steel sheets. Examples of the steel sheet include low carbon steel and extremely low carbon steel. The method and the material of the steel sheet to be used are not particularly limited, and examples thereof include a steel sheet manufactured through processes such as casting, hot rolling, pickling, pickling, cold rolling, annealing, and temper rolling.

<Regarding Sn-Based Alloy Plating Layer>

On at least one side of the steel sheet, a composite plating layer (hereinafter, also simply referred to as "composite plating layer") is formed. This composite plating layer is composed of an Fe—Ni—Sn alloy layer containing from 2 mg/m$^2$ to 200 mg/m$^2$ of Ni per side in terms of metal Ni and from 0.1 g/m$^2$ to 10 g/m$^2$ of Sn per side in terms of metal Sn and an island-shaped Sn located on the Fe—Ni—Sn alloy layer.

The Fe—Ni—Sn alloy layer is formed by alloying some or all of Ni and some Sn by melting heat treatment.

[Fe—Ni—Sn Alloy Layer]

The Fe—Ni—Sn alloy layer has an effect of improving corrosion resistance. This is because Ni and Sn, which are nobler metals than iron, electrochemically form an alloy layer with Fe, thereby improving the corrosion resistance of Fe itself.

Here, the effect of improving corrosion resistance by Ni is determined by the amount of Ni in the composite plating layer. The amount of Ni in the composite plating layer can be adjusted by the amount of Ni in a Ni plating layer or an Fe—Ni plating layer for forming the composite plating layer.

When the amount of Ni is 2 mg/m$^2$ or more per one side in terms of metal Ni, an effect of corrosion resistance exhibits. As the amount of Ni increases, the effect of improving corrosion resistance increases. On the other hand, when the amount of Ni exceeds 200 mg/m$^2$ per side in terms of metal Ni converted amount, the effect of improving the corrosion resistance is saturated, and a further increase in the amount is economically unfavorable. sulphide stain resistance is also inferior. Therefore, the amount of Ni is from 2 mg/m$^2$ to 200 mg/m$^2$ per side in terms of metal Ni converted amount. The amount of Ni is more preferably from 2 mg/m$^2$ to 180 mg/m$^2$ per side in terms of metal Ni converted amount.

[Island-Shaped Sn Layer]

The island-shaped Sn layer formed on the Fe—Ni—Sn alloy layer has an effect of improving corrosion resistance and lacquer adhesion. Sn is a more noble metal in atmospheric corrosion environment than iron, and prevents corrosion of Fe as a barrier type film. On the other hand, in an acidic corrosive environment like an acidic beverage can, Sn improves corrosion resistance by sacrificing corrosion of iron. By the existence of the Sn layer in the form of an island, lacquer adhesion is improved by an anchor effect and a growth suppressing effect of tin oxide by the presence of the Fe—Ni—Sn alloy layer corresponding to a sea portion. Since growth of tin oxide is suppressed, there is also an effect of suppressing yellowing.

When the composite plating layer is observed from the thickness direction, where the surface of the Fe—Ni—Sn alloy layer is a sea portion (or continuous phase) and the Sn layer is island portions (dispersed phase), an island-shaped Sn layer is a layer in which the plurality of island portions of Sn layers are scattered in the sea portion.

Here, the effect of improving corrosion resistance by Sn and the effect of improving lacquer adhesion are determined by the amount of Sn in the composite plating layer. The amount of Sn in the composite plating layer is adjustable by the amount of Sn in the Sn plating layer for forming the composite plating layer.

The amount of Sn is required to be 0.1 g/m$^2$ or more per side in terms of metal Sn converted amount. As the amount of Sn increases, an effect of improving corrosion resistance and lacquer adhesion increases, and on the other hand, when the amount of Sn exceeds 10 g/m$^2$ per side in terms of metal Sn converted amount, the effect of improving the corrosion resistance is saturated, and further increase is unfavorable from the viewpoint of economy. lacquer adhesion tends to be lowered. Therefore, the amount of Sn is from 0.1 g/m$^2$ to 10 g/m$^2$ per side in terms of metal Sn converted amount. The amount of Sn is more preferably from 0.2 g/m² to 8 g/m² per side in terms of metal Sn converted amount.

The Ni amount and Sn amount of the composite plating layer are measured by ICP emission spectrometry or calibration curve method using GDS (glow discharge emission spectroscopy). In particular, when measuring, from an Sn-based alloy plated steel sheet having a coating layer formed on a composite plating layer, the metal Ni amount and the metal Sn amount in the composite plating layer, a calibration curve method using GDS (glow discharge emission spectroscopy) is suitable.

Specifically, the measurement method by ICP emission spectrometry is as follows.

First, a test piece of a steel sheet (a test piece of a steel sheet on which only a composite plating layer is formed) in which a coating layer is not formed on the composite plating layer and the composite plating layer is exposed is prepared. The test piece is immersed in 10% nitric acid to dissolve the composite plating layer containing Ni and Sn, and Ni and Sn in the obtained solution is determined by ICP emission spectrometry (for example, 799ce manufactured by Agilent Technologies Japan, Ltd., using Ar for carrier gas.). Then, the coating weight (Ni amount and Sn amount) of the composite plating layer is determined based on the intensity signal obtained by analysis, the calibration curve prepared from the solution of known concentration, and the formation area of the composite plating layer of the test piece.

The measurement method by calibration curve method using GDS (glow discharge emission spectroscopy) is as follows.

First, using a reference sample whose Ni amount and Sn amount of the composite plating layer is known, a relationship between the intensity signal of metal Ni and Sn in the composite plating layer of the reference sample and the sputtering speed is determined in advance by GDS while performing sputtering, and a calibration curve is prepared.

On the other hand, a test piece (a test piece of a steel sheet in which a composite plating layer and a coating layer are sequentially formed) of a steel sheet having a coating layer formed on the composite plating layer is prepared. From the surface of the coating layer of the test piece, analysis by GDS is performed while sputtering, and the intensity signal of Ni and Sn of the composite plating layer is measured. The Ni amount and Sn amount in the composite plating layer is determined from the obtained intensity signal of Ni and Sn, the sputtering rate, and the prepared calibration curve.

Here, the composite plating layer is defined as a region from the depth at which the intensity signal of Zr is ½ of the maximum value of the intensity signal of Zr to the depth at which the intensity signal of Fe is ½ of the maximum value of the intensity signal of Fe. Then, the average values of the Ni amount and Sn amount in the region are taken as the metal Ni amount and Sn amount of the composite plating layer.

[Method of Forming Composite Plating Layer]

A composite plating layer having an island-shaped Sn layer formed on the Fe—Ni—Sn alloy layer is formed, for example, as follows. First, a Ni plating layer or an Fe—Ni plating layer to serve as an underlayer is formed on at least one side of a steel sheet. Next, an Sn plating layer is formed on the Ni plating layer or the Fe—Ni plating layer. Then, by heating and melting the Ni plating layer or the Fe—Ni plating layer and the Sn plating layer, a composite plating layer is formed. Specifically, by a melting heat treatment, Fe of a steel sheet, Ni of the Ni plating layer or the Fe—Ni plating layer, and some Sn of the Sn plating layer are alloyed to form an Fe—Ni—Sn alloy layer, and the remaining Sn plating layer is formed as an island-shaped Sn layer.

The methods of Ni plating and Fe—Ni plating are not particularly specified, and a known electroplating method can be used. Examples thereof include a plating method using a sulfuric acid bath or a chloride bath.

The method of applying the Sn plating to the surface of the Ni plating layer or the Fe—Ni plating layer is not particularly restricted, and, for example, a known electroplating method is preferable. Examples of the electroplating method include an electrolytic method using a well-known ferrostan bath, halogen bath, alkaline bath, or the like.

After the Sn plating, a heat plating treatment is performed to heat the plated steel sheet to 231.9° C., which is the melting point of Sn, or higher. By this heat melting treatment, the Sn plating layer melts and is alloyed with the underlying Ni plating layer or the Fe—Ni plating layer to form an Fe—Ni—Sn alloy layer, and an island-shaped Sn layer is formed.

<Regarding Coating Layer Containing Zirconium Oxide and Tin Oxide>

The Sn-based alloy plated steel sheet of the disclosure includes a coating layer containing both zirconium oxide and tin oxide on the surface of the composite plating layer formed on the surface of the steel sheet.

The content of zirconium oxide in the coating layer is from 0.2 mg/m² to 50 mg/m² per one side in terms of metal Zr amount (or in terms of metal Zr converted amount). The content of zirconium oxide in the coating layer is the content of zirconium oxide per one side.

Tin oxide in the coating layer is tin oxide in which the peak position of binding energy of $Sn3d_{5/2}$ by XPS is 1.6 eV or higher than the peak position of binding energy of the metal Sn.

The above $Sn3d_{5/2}$ indicates the energy level of electrons in Sn as described in p. 83 of Non-Patent Document 1.

The peak position of binding energy of $Sn3d_{5/2}$ by XPS of tin oxide is a peak position obtained by measuring the surface of the coating layer by XPS. However, when a layer such as a chemical conversion treatment layer, or a coating layer is further formed on the surface of the coating layer, after removing these layers, the peak position of binding energy of $Sn3d_{5/2}$ by XPS is measured with respect to the surface of the coating layer etched to a depth of from 0.5 to 2 nm in terms of $SiO_2$ by sputtering.

Here, in the Sn-based composite plated steel sheet of the disclosure, the yellow stain resistance, the lacquer adhesion, and the sulphide stain resistance can be further improved by including a coating layer in which the above-described zirconium oxide and tin oxide coexist on the surface of the composite plating layer. A coating layer containing only tin oxide or a coating layer containing only zirconium oxide cannot sufficiently improve the yellow stain resistance, the lacquer adhesion, and the sulphide stain resistance. Although the reason for this is not clear, the present inventors consider as follows from a detailed investigation.

Unlike the tin oxide of the present disclosure, it has been found that tin oxide which is formed and grown on the surface of the composite plating layer conventionally is tin oxide in which the peak position of binding energy of $Sn3d_{5/2}$ by XPS is less than 1.6 eV higher than the peak position of binding energy of metal Sn. This is presumed to be an oxygen deficient type, or tin oxide having oxygen vacancies (hereinafter referred to as "oxygen deficient type tin oxide"), and oxidation of tin on the surface of the composite plating layer progresses with time and oxygen-deficient type tin oxide grows. On the other hand, tin oxide in which the peak position of binding energy of $Sn3d_{5/2}$ by XPS is 1.6 eV or higher than the peak position of binding energy of the metal Sn has less oxygen vacancies and is more stable than oxygen-deficient type tin oxide as described above (hereinafter, defined as "stable type tin oxide"). Therefore, when stable type tin oxide is present on the surface of the composite plating layer, the growth rate of oxygen-deficient type tin oxide is low. However, in the long term, oxygen-deficient type tin oxide increases, the appearance turns yellow, or the lacquer adhesion deteriorates. However, when stable type tin oxide coexists with zirconium oxide, growth of oxygen-deficient type tin oxide is suppressed.

In order to realize a growth suppressing effect of oxygen-deficient type tin oxide, zirconium oxide whose metal Zr amount is from 0.2 $mg/m^2$ to 50 $mg/m^2$ per side is necessary in the coating layer. When the content of zirconium oxide is less than 0.2 $mg/m^2$ in terms of metal Zr amount, not only the growth suppressing effect of the oxygen-deficient type tin oxide is insufficient but also the sulphide stain resistance is poor. When the content of zirconium oxide exceeds 50 $mg/m^2$ in terms of metal Zr amount, the lacquer adhesion is deteriorated due to excessive zirconium oxide. The content of zirconium oxide is preferably in the range of from 1.0 $mg/m^2$ to 30 $mg/m^2$, more preferably in the range of from 2.0 $mg/m^2$ to 10 $mg/m^2$ in terms of metal Zr amount per one side.

For tin oxide, the peak position of binding energy of $Sn3d_{5/2}$ by XPS needs to be 1.6 eV or higher than the peak position of binding energy of metal Sn. When the peak position of binding energy of tin oxide is 1.6 eV or higher than the peak position of binding energy of metal Sn, tin oxide is stable type tin oxide, and growth of oxygen-deficient type tin oxide is suppressed. On the other hand, when the difference between the peak position of binding energy of $Sn3d_{5/2}$ by XPS and the peak position of binding energy of metal Sn is less than 1.6 eV, tin oxide is oxygen-deficient type tin oxide, and growth of oxygen-deficient type tin oxide progresses.

Since tin oxide stabilizes as the binding energy increases, the upper limit value of the peak position of binding energy of $Sn3d_{5/2}$ of tin oxide is not specified, and realistically, the position is about 2.0 eV larger than the peak position of binding energy of metal Sn.

In other words, the peak position of binding energy of $Sn3d_{5/2}$ by XPS of tin oxide may be larger than the peak position of binding energy of metal Sn in the range of from 1.6 eV to 2.0 eV.

Here, when "the peak position where the peak position of binding energy of $Sn3d_{5/2}$ of tin oxide by XPS is 1.6 eV or higher than the peak position of binding energy of metal Sn" is measured by the measurement method described below, there is no problem even when the coating layer contains tin oxide (for example, oxygen-deficient type tin oxide whose peak position of binding energy of $Sn3d_{5/2}$ by XPS is less than 1.6 eV higher than the peak position of binding energy of metal Sn) of a structure other than stable type tin oxide.

It is preferable that the coating layer further contains phosphorus having a P amount/metal Zr amount of from 0.2 to 1 in terms of mass ratio per unit area. By including P in the above mass ratio, the coating layer containing zirconium oxide and tin oxide becomes denser, and a growth suppressing effect of tin oxide tends to be improved. When the P amount/metal Zr amount is less than 0.2, the growth suppressing effect of tin oxide may be poor. When the P amount/metal Zr amount exceeds 1, P is excessive, and the growth suppressing effect of tin oxide when zirconium oxide and tin oxide coexist may be poor. The mass ratio of the P amount and the Zr amount of metal per unit area is more preferably from 0.3 to 0.8.

The coating layer containing zirconium oxide and tin oxide may be in a mixed state of the oxides or a solid solution of the oxides, and the state thereof is not limited. Any element such as Fe, Ni, Cr, Ca, Na, Mg, Al, or Si may be contained in the coating layer without any problem.

Figure 1:
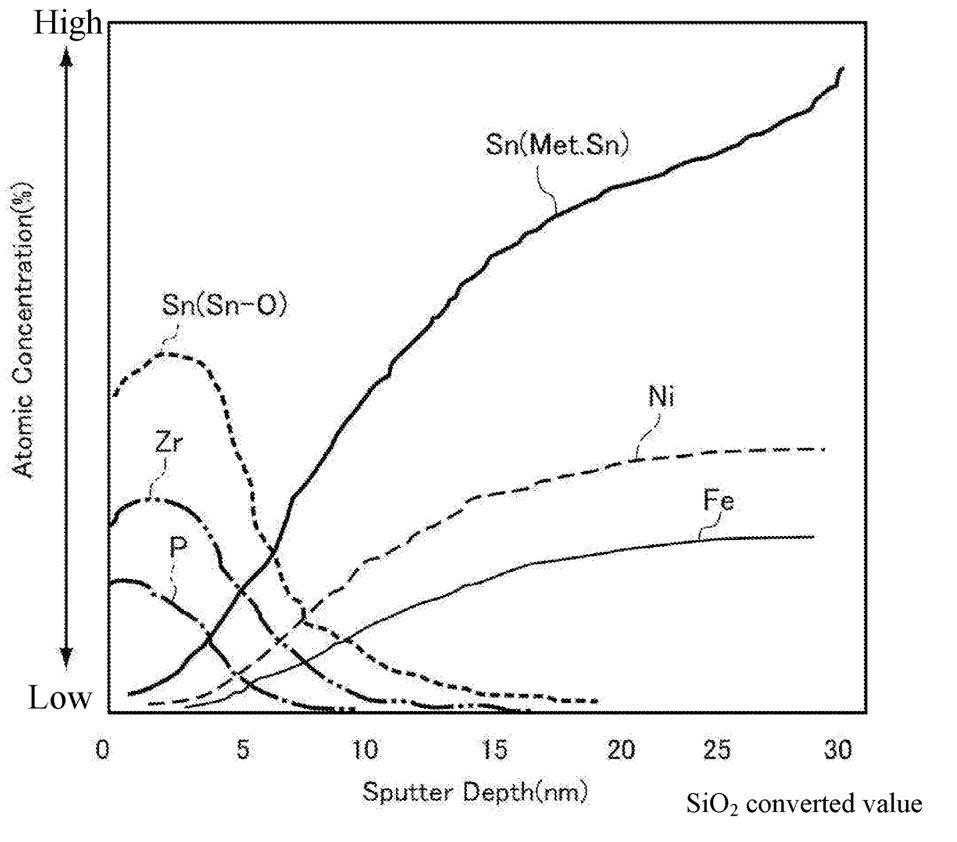
FIG. 1 is a view showing an example of an element concentration profile in a thickness direction (depth direction) of a composite plating layer and a coating layer of the Sn-based composite plated steel sheet of the disclosure.

An example of the element concentration profile in the thickness direction (depth direction) of the composite plating layer and the coating layer of the Sn-based composite plated steel sheet of the disclosure is shown in FIG. 1. The element concentration profile shown in FIG. 1 is a diagram obtained by measuring the distribution of the element concentration from the surface of the coating layer through the composite plating layer to the surface of the steel sheet by analysis in the depth direction of XPS.

As shown in FIG. 1, it can be seen that the Sn-based composite plated steel sheet of the disclosure has a coating layer in which zirconium oxide and tin oxide coexist on the surface of the composite plating layer.

The thickness of the coating layer is preferably from 2 nm to 100 nm in terms of $SiO_2$ converted thickness by XPS. When the thickness of the coating layer is less than 2 nm, an oxygen permeation suppressing effect is poor because the thickness of the coating layer is too thin, and as a result, oxygen-deficient type tin oxide may easily grow. On the other hand, when the thickness of the coating layer is more than 100 nm, the tin oxide itself tends to cohesively break because the thickness of the coating layer is too thick, and as a result, the lacquer adhesion and corrosion resistance after coating may be poor. In addition to that, yellow stain resistance is favorable, but the appearance may become yellowish immediately after the production. The thickness of the coating layer is more preferably in the range of from 4 nm to 30 nm.

The thickness of the coating layer is the thickness from the surface to a region where the element concentration of metal tin (Sn present as metallic tin) is 10% or less when the sum of the element concentrations of Sn present as tin oxide, Sn present as metal tin, and Zr present as zirconium oxide is taken as 100% in the XPS depth direction analysis and is the value obtained by $SiO_2$ converted thickness.

In the coating layer, the content of zirconium oxide (metal Zr amount) and the P amount are values obtained by dissolving the Sn-based alloy plated steel sheet of the disclosure in an acidic solution such as hydrofluoric acid and sulfuric acid, and dissolving the obtained solution by chemical analysis of Inductively Coupled Plasma (ICP) emission spectrometry or the like. Alternatively, the content of zirconium oxide (metal Zr amount) and the P amount may be obtained by fluorescent X-ray measurement.

A method of forming a coating layer containing zirconium oxide and tin oxide will be described below.

In order to form a coating layer, first, a zirconium oxide layer containing zirconium oxide is formed on the surface of a composite plating layer of a steel sheet on which a composite plating layer is formed.

A zirconium oxide layer containing zirconium oxide can be formed on the surface of a composite plating layer by performing an immersion treatment on a composite plating layer in an immersion bath containing zirconium ions, or performing a cathodic electrolytic treatment in a cathode electrolyte containing zirconium ions. However, in the immersion treatment, the surface of the underlying composite plating layer is etched to form a zirconium oxide layer containing zirconium oxide. Therefore, the coating weight of the composite plating layer tends to be nonuniform, and the processing time is prolonged, which is disadvantageous for industrial production. On the other hand, in a cathodic electrolytic treatment, it is possible to obtain a uniform coating by combining surface cleaning by forcible charge transfer and hydrogen generation at the steel sheet interface and adhesion promotion effect by pH rise. Further, in such a cathodic electrolytic treatment, nitrate ions and ammonium ions coexist in a cathode electrolyte, and it is thus possible to carry out a treatment for a short time of about several seconds to several tens of seconds. It is therefore considerably advantageous industrially.

Therefore, it is preferable to utilize a method based on a cathodic electrolytic treatment for forming a zirconium oxide layer containing zirconium oxide.

The concentration of zirconium ion in the cathode electrolyte for performing a cathodic electrolytic treatment may be appropriately adjusted according to production equipment, production rate (capacity), and the like. For example, the zirconium ion concentration is preferably from 100 ppm to 4,000 ppm. Other components such as fluoride ion, ammonium ion, nitrate ion, or sulfate ion may be contained in the solution containing zirconium ions without any problem.

In order to contain phosphorus (P) having a P amount/metal Zr amount of from 0.2 to 1.0 in terms of mass ratio per unit area in the coating layer containing zirconium oxide and tin oxide, phosphate ions may be contained in the immersion bath or cathode electrolytic bath at a concentration of from $1/10$ to three times of the concentration of zirconium ion.

As a supply source of zirconium ions in the cathode electrolyte, for example, a zirconium complex such as $H_2ZrF_6$ can be used. Zr in the Zr complex as described above becomes $Zr^{4+}$ due to an increase in pH at the cathode electrode interface to be present in the cathode electrolyte. Such a Zr ion further reacts in the cathode electrolyte to become zirconium oxide. When phosphoric acid is contained in the cathode electrolyte, zirconium phosphate is also formed.

As the solvent of the cathode electrolyte during the cathodic electrolytic treatment, for example, water such as distilled water can be used. However, the solvent is not restricted to water such as distilled water, and can be appropriately selected depending on the substance to be dissolved, the formation method, and the like.

Here, the liquid temperature of the cathode electrolyte during the cathodic electrolytic treatment is not particularly limited, and is preferably set to, for example, a range of from 10° C. to 50° C. By performing cathode electrolysis at 50° C. or lower, it is possible to form a dense and uniform coating layer structure formed of very fine particles. On the other hand, when the liquid temperature is lower than 10° C., the formation efficiency of a film is poor, and cooling of a solution is required when the outside temperature is high such as in summer, which is not only uneconomical, but also lowers the corrosion resistance after coating. When the liquid temperature exceeds 50° C., the zirconium oxide coating film structure formed is nonuniform, defects, cracks, micro cracks, and the like are generated, making it difficult to form a dense film, and are starting points for corrosion and the like, which is not preferable.

The pH of the cathode electrolyte is not particularly restricted, and is preferably from 3 to 5. When the pH is less than 3, the production efficiency of zirconium oxide is poor, and when the pH is more than 5, a large amount of precipitation is generated in the cathode electrolyte, resulting in poor continuous productivity.

In order to adjust the pH of the cathode electrolyte or increase the electrolytic efficiency, for example, nitric acid, ammonia water, or the like may be added to the cathode electrolyte.

The current density during the cathodic electrolytic treatment is preferably, for example, from 0.05 $A/dm^2$ to 50 $A/dm^2$. When the current density is less than 0.05 $A/dm^2$, the formation efficiency of zirconium oxide is lowered, stable formation of a coating layer containing zirconium oxide becomes difficult, and not only deterioration of yellow stain resistance and sulphide stain resistance but also corrosion resistance after coating are lowered. When the current density exceeds 50 $A/dm^2$, the formation efficiency of zirconium oxide is too high, and zirconium oxide which is coarse and inferior in adhesion is formed, which is not preferable. A more preferable current density range is from 1 $A/dm^2$ to 10 $A/dm^2$.

During the formation of the zirconium oxide layer, the time for the cathodic electrolytic treatment does not matter. The time for the cathodic electrolytic treatment may be appropriately adjusted according to the current density for a target content (metal Zr amount) of zirconium oxide in the coating layer.

During the cathodic electrolytic treatment, there is no problem with the energization pattern whether the pattern is continuous or intermittent.

The coating layer containing zirconium oxide and tin oxide can be obtained by subjecting a zirconium oxide layer containing zirconium oxide to an anodic electrolytic treatment in an anode electrolyte. Specific components of the anode electrolyte during the anodic electrolytic treatment are not particularly specified. However, with respect to the liquid property of the anode electrolyte, from weakly acidic to alkaline is preferable. Here, weakly acidic to alkaline means that the pH is from 3 to 14. When the pH is in this range, dissolution of the composite plating layer in the anode electrolyte becomes gentle, whereby a coating layer containing stable type tin oxide can be stably formed.

Examples of the anode electrolyte during anodic electrolytic treatment include an aqueous solution containing an electrolyte such as a hydroxide of an alkali metal and alkaline earth metal or a salt of an alkali metal or an alkaline earth metal (a carbonate, a phosphate, an organic acid salt, a borate, or sulfate). Specific examples of the anode electrolyte include an aqueous solution containing an electrolyte such as sodium carbonate, sodium hydrogencarbonate, sodium diphosphate, trisodium citrate, ammonium monitartrate, or sodium sulfate.

The lower limit of the concentration of the electrolyte is not particularly limited, and it is preferable that the concentration is such that the electrical conductivity satisfies not less than 0.1 S/m. The upper limit of the concentration of these electrolytes is also not particularly specified, and when the electrolyte concentration is too high, there is a possibility that precipitation is generated at the time of storage to cause a trouble such as clogging of piping, and therefore, it is preferable that the concentration is not more than the solubility at 0° C. of each electrolyte. The concentration of the electrolyte is preferably a concentration satisfying an electrical conductivity of from 0.5 S/m to 4 S/m, and more preferably, is a concentration satisfying an electrical conductivity of from 1 S/m to 2.5 S/m.

The electrical conductivity may be measured using a commercially available electrical conductivity meter, and it is possible to use, for example, an electrical conductivity cell CT-27112B manufactured by DKK-TOA CORPORATION.

As the solvent of the anode electrolyte during the anodic electrolytic treatment, for example, water such as distilled water can be used. The solvent is not restricted to water such as distilled water.

Here, the liquid temperature of the anode electrolyte at the time of the anodic electrolytic treatment is not particularly limited, and is preferably in the range of from 5° C. to 60° C., more preferably in the range of from 15° C. to 50° C. When the liquid temperature is too low, the electrolysis efficiency is poor, and stable type tin oxide is difficult to form. On the other hand, when the liquid temperature is too high, evaporation of the solvent of the anode electrolyte is considerable, the workability and operation stability are poor, making it difficult to obtain stable type tin oxide.

The current density at the time of anodic electrolytic treatment is not particularly limited, and is preferably, for example, in the range of from 0.5 A/dm$^2$ to 10 A/dm$^2$. When the current density is from 0.5 A/dm$^2$ to 10 A/dm$^2$, stable type tin oxide can be uniformly and stably formed. When the current density is less than 0.5 A/dm$^2$, it is necessary to prolong the electrolysis treatment time, and the corrosion resistance after coating accompanying dissolution of the composite plating layer is easily lowered. On the other hand, when the current density exceeds 10 A/dm$^2$, hydrogen generation in the composite plating layer is considerable, dissolution of the composite plating layer accompanying the increase in pH occurs, which is not preferable from the viewpoint of production efficiency, and through formation of nonuniform tin oxide, yellow stain resistance and sulphide stain resistance tend to be lowered. A preferable current density range is from 1.0 A/dm$^2$ to 3 A/dm$^2$.

The anodic electrolytic treatment time is not particularly specified. The time may be arbitrarily determined according to the current density, the electrode length, the production speed (sheet passing speed), and the like.

The thickness of the coating layer formed through the cathodic electrolytic treatment and the anodic electrolytic treatment described above can be mainly controlled by the amount of electricity (electric quantity) at the time of anode electrolysis, the larger the amount of current flowing is, the thicker the thickness of the coating layer becomes. In order to obtain a recommended coating layer having a thickness of from 2 nm to 100 nm, it is preferable to set the amount of electricity to be supplied during the anodic electrolytic treatment to be from 0.5 C/dm$^2$ to 30 C/dm$^2$. In order to obtain a coating layer having a thickness of from 4 nm to 30 nm, it is preferable to set the amount of electricity to be supplied during the anodic electrolytic treatment to be from 1 C/dm$^2$ to 15 C/dm$^2$.

During the anodic electrolytic treatment, there is no problem with the energization pattern whether the pattern is continuous or intermittent.

EXAMPLES

Subsequently, the Sn-based alloy plated steel sheet and the method of manufacturing the same of the disclosure will be described in detail while showing Examples and Comparative Examples. The following Examples are merely examples of the Sn-based alloy plated steel sheet and the method of manufacturing the same of the disclosure, and the Sn-plated steel sheet and the method of manufacturing the same of the disclosure are not limited to the following Examples.

<Test Specimen>

A method of preparing a test specimen will be described. The test specimens of Examples to be described below were prepared in accordance with this method of preparing a test specimen.

First, a low carbon cold-rolled steel sheet with a thickness of 0.2 mm was subjected to electrolytic alkaline degreasing, water washing, diluted sulfuric acid pickling, and water washing as pretreatments, followed by Ni plating with a sulfuric acid bath. The coating weight of the Ni plating layer was in the range of from 1 mg/m$^2$ to 300 mg/m$^2$ per one side in terms of metal Ni converted amount. Further, on the Ni plating layer, electric Sn plating was performed using a phenolsulfonic acid bath. The coating weight of the Sn plating layer was in the range of from 0.08 g/m$^2$ to 15 g/m$^2$ per one side in terms of metal Sn converted amount. A steel plate having a Ni plating layer and an Sn plating layer formed on both sides was subjected to a heat melting treatment to prepare a steel plate having a composite plating layer having an Fe—Ni—Sn alloy layer and an island-shaped Sn layer located on the Fe—Ni—Sn alloy layer formed on both sides.

Next, the steel sheet on which the composite plating layers were formed on both sides was cathodically electrolyzed in an aqueous solution containing zirconium fluoride to form a zirconium oxide layer on the surfaces of the composite plating layers. The liquid temperature of the cathode electrolyte was adjusted to 35° C., and the pH of the cathode electrolyte was adjusted to be from 3 to 5, and the current density and the cathodic electrolytic treatment time of the cathodic electrolytic treatment were appropriately adjusted according to the content (metal Zr amount) of zirconium oxide in the target coating layer.

Further, the steel sheet having the composite plating layer and the zirconium oxide layer formed thereon was subjected to anodic electrolytic treatment in sodium hydrogencarbonate solution (anode electrolyte) having an electrical conductivity of 2.0 S/m to form a coating layer containing zirconium oxide and tin oxide from the zirconium oxide layer. The liquid temperature of the anode electrolyte was 25° C., and the current density of the anodic electrolytic treatment was 2 A/dm$^2$. At some level, the type of anode electrolyte and anodic electrolytic treatment conditions were changed. The anodic electrolytic treatment time was appropriately adjusted. The pH of the anode electrolyte was measured with a glass electrode.

Various evaluations shown below were performed on the Sn-based alloy plated steel sheets prepared as described above.

[Coating Weight (Ni Amount and Sn Amount) of Composite Plating Layer]

The coating weight (Ni amount and Sn amount) of the composite plating layer was measured by the "measurement method by ICP emission spectrometry" described above.

[Zirconium Oxide Content (Metal Zr Amount) and P Amount in Coating Layer]

The zirconium oxide content (metal Zr amount) and the P amount in the coating layer were determined as follows.

A plurality of test pieces of a steel sheet with a coating layer in which the contents of the metal Zr amount and the P amount were known were prepared. Next, with respect to each test piece, the intensities of the fluorescent X-rays derived from the metal Zr and P were measured in advance from the surface of the coating layer of the test piece with a fluorescent X-ray analyzer (ZSX Primus manufactured by Rigaku Corporation). Calibration curves showing the relationships between the measured fluorescent X-ray intensity and metal Zr and P were each prepared.

Then, a test piece of an Sn-based composite plated steel sheet to be measured was prepared. The surface of the coating layer of this test piece was measured for the intensity of the fluorescent X-rays derived from the metal Sn, metal Zr, and P with a fluorescent X-ray analyzer (ZSX Primus manufactured by Rigaku Corporation). The content of zirconium oxide (metal Zr amount) and the P amount in the coating layer were calculated by utilizing the obtained fluorescent X-ray intensity and the prepared calibration curves relating to the metal Zr and P in advance.

As the measurement conditions, an X-ray source Rh, a tube voltage of 50 kV, a tube current of 60 mA, a spectroscopic crystal LiFl, and a measuring diameter of 30 mm were used.

[Peak Position of Binding Energy of $Sn3d_{5/2}$ of Tin Oxide in Film Layer by XPS]

The surface of the coating layer was measured with XPS (PHI Quantera SXM manufactured by ULVAC-PHI, Inc.) to examine the peak position of binding energy of $Sn3d_{5/2}$ of tin oxide (denoted as "XPS energy peak position" in the Table) in the coating layer.

As the measurement conditions, an X-ray source mono-AlKα ray (hv=1466.6 eV, 100.8 W), an X-ray diameter of 100 μmφ, a detection depth of several nm (extraction angle) 45°, and an analysis range of 1400×100 μm were used.

When the peak position of binding energy of $Sn3d_{5/2}$ of tin oxide is 1.6 eV or higher than the peak position (=484.9 eV) of binding energy of metal Sn, the evaluation was "OK" on the assumption that stable type tin oxide was mainly formed. When the difference was less than 1.6 eV, the evaluation was "NG" on the assumption that oxygen-deficient type tin oxide was mainly formed. Those evaluated as "OK" were regarded as acceptable.

[Thickness of Coating Layer]

The thickness of the coating layer was measured with XPS (PHI Quantera SXM manufactured by ULVAC-PHI, Inc.). Specifically, a test piece of an Sn-based alloy plated steel sheet to be measured is prepared. Analysis in the thickness direction (depth direction) with XPS (PHI Quantera SXM manufactured by ULVAC-PHI, Inc.) was performed from the surface of the coating layer of this test piece, and the thickness from the surface to a region where the element concentration of metal tin (Sn present as metal tin) is 10% or less was calculated as $SiO_2$ equivalent thickness when the total element concentration of Sn present as tin oxide, Sn existing as metallic tin and Zr present as zirconium oxide was 100%.

As the measurement conditions, X-ray source mono-AlK α ray (hv=1466.6 eV, 100.8 W), an X-ray diameter of 100 μmφ, a detection depth of several nm (extraction angle) 45°, an analysis range of 1400×100 μm, neutralizing gun 1.0 V, 20 μA, sputtering conditions $Ar^+$, an acceleration voltage of 1 kV, and a sputtering speed of 1.5 nm/min ($SiO_2$ converted value) were used.

[Yellow Stain Resistance]

A wet test was carried out in which a test specimen of the Sn-based alloy plated steel sheet was placed in a thermohygrostat bath kept at 40° C. and a relative humidity of 80% for 4 weeks, and the change amount Δb* of the color difference b* value before and after the wet test was determined and evaluation was performed. When the change amount Δb* was 1 or less, the evaluation was "A", when the change amount was more than 1 to 2, the evaluation was "B", when the change amount was more than 2 to 3, the evaluation was "C", and when the change amount exceeded 3, the evaluation was "NG". Evaluations "A", "B", and "C" were accepted. b* was measured using a commercially available color-difference meter SC-GV5 manufactured by Suga Test Instruments Co., Ltd. Measurement conditions of b* were light source C, total reflection, and a measurement diameter of 30 mm.

[Lacquer Adhesion]

The lacquer adhesion was evaluated as follows.

The test specimen of the Sn-based alloy plated steel sheet was subjected to a wet test using the method described in [Yellow Stain Resistance], and then, 7 $g/m^2$ of a commercially available epoxy resin coating for cans in dry mass was coated on the surface thereof, baked at 200° C. for 10 minutes, and placed at room temperature for 24 hours. Thereafter, scratches reaching the surface of the steel sheet were made in a grid pattern (seven scratches at intervals of 3 mm each in the longitudinal direction and the lateral direction) for the obtained Sn-based composite plated steel sheet, and evaluation was performed by carrying out a tape peeling test at the site. When the coating at the tape sticking site was not peeled off, the evaluation was "A", when coating peeling was observed around the grid scratches, the evaluation was "B", and when coating peeling was observed in a square of the grid, the evaluation was "NG". The evaluations "A" and "B" were acceptable.

[Sulphide Stain Resistance]

The sulphide stain resistance was evaluated as follows.

A commercial commercially available epoxy resin coating for cans was coated at a dry mass of 7 $g/m^2$ on the surface of the test specimen of the Sn-based alloy plated steel sheet prepared and subjected to a wet test by the method described in the above [Lacquer Adhesion], baked at 200° C. for 10 minutes, and left at room temperature for 24 hours. Thereafter, the obtained Sn-based composite plated steel sheet was cut to a predetermined size, immersed in an aqueous solution containing 0.3% of sodium dihydrogen phosphate, 0.7% of sodium hydrogen phosphate, and 0.6% of L-cysteine hydrochloride, retort treated at 121° C. for 60 minutes in a sealed container, and evaluation was performed from the appearance after the test. When no change in appearance was observed after the test, the evaluation was "A", when slightly (10% or less) blackening was observed, the evaluation was "B", and when blackening was observed in the area of more than 10% of the test surface, the evaluation was "NG". The evaluations "A" and "B" were acceptable.

[Corrosion Resistance after Coating]

The corrosion resistance after coating was evaluated as follows.

A commercial commercially available epoxy resin coating for cans was coated at a dry mass of 7 $g/m^2$ on the surface of the test specimen of the Sn-based alloy plated steel sheet prepared and subjected to a wet test by the method described in the above [Lacquer Adhesion], baked at 200° C. for 10 minutes, and left at room temperature for 24 hours. Thereafter, the obtained Sn-based composite plated steel sheet was cut to a predetermined size, immersed in commercially available tomato juice at 60° C. for 7 days, and the presence or absence of rust after that was visually evaluated. When rust was not observed at all, the evaluation was "A", when rust was observed at an area ratio of 10% or less of the entire test surface, the evaluation was "B", and when rust was observed at an area ratio of more than 10% of the entire test surface, the evaluation was "NG". The evaluations "A" and "B" were acceptable.

Example 1

Table 1 shows the results when the Ni amount and Sn amount in the composite plating layer and the content of the zirconium oxide in the coating layer were changed. The concentration of zirconium in the solution containing zirconium fluoride was 1,400 ppm. After a zirconium oxide layer was formed, the zirconium oxide layer was subjected to anodic electrolytic treatment in a sodium hydrogencarbonate solution having an electrical conductivity of 2.0 S/m (liquid property: weakly acidic to alkaline, pH=8) to form a coating layer. The liquid temperature of the anode electrolyte was 25° C., and the amount of electricity to be supplied for the anodic electrolytic treatment was 2 C/dm².

For comparison, the following test specimens were also prepared.

Comparative Examples a1 to a2

Test specimens in which a composite plating layer were formed on both sides of a steel sheet, then a zirconium oxide layer was formed, and anodic electrolytic treatment was not applied to the zirconium oxide layer Comparative Example a9

A test specimen in which after forming composite plating layers on both sides of a steel sheet, before forming a zirconium oxide layer, an anodic electrolytic treatment was carried out on the sheet in a sodium hydrogencarbonate solution (anode electrolyte) having an electrical conductivity of 2.0 S/m and a liquid temperature of 25° C. at a current density of 2 A/dm², then a zirconium oxide layer was formed, and no anodic electrolytic treatment was carried out on the zirconium oxide layer Comparative Example a10

A test specimen in which after forming composite plating layers on both sides of a steel sheet, a zirconium oxide layer was formed by an alternating electrolytic treatment in which cathodic electrolytic treatment and anodic electrolytic treatment were alternately performed under conditions of a current density of 3 A/dm² in an aqueous solution containing zirconium fluoride having a liquid temperature of 35° C. and a pH of 4, and an anodic electrolytic treatment was not performed on the zirconium oxide layer Comparative Example a11

A test specimen in which after forming composite plating layers on both sides of a steel sheet, an anodic electrolytic treatment was carried out on the composite plating layers of the Sn plating layer in a sodium hydrogencarbonate solution (anode electrolyte) having an electrical conductivity of 2.0 S/m and a liquid temperature of 25° C. at a current density of 2 A/dm², and then no zirconium oxide layer was formed In Table 1, properties of the zirconium oxide layer in a1 to a2, a9, and a10 (examples in which the zirconium oxide layer was not subjected to anodic electrolytic treatment) as Comparative Examples are described in the column of "Coating Layer".

Properties of the tin oxide layer in Comparative Example a11 are described in the column of "Coating Layer".

TABLE 1

| | | Coating layer | | | | Property evaluation | | | | | | |
| | | | | | | yellow stain resistance | | | | | | |
| | | | Zr oxide | Tin oxide | | Color difference b* | | | | | | |
| | | Composite plating layer | Content | XPS energy | | After | | | | | corrosion | |
| | No | Ni amount (mg/m²) | Sn amount (g/m²) | (metal Zr amount) (mg/m²) | peak position (eV) | Thickness (nm) | Initial | lapse of time | Δb* | lacquer adhesion | sulphide stain resistance | resistance after coating | Note |
|---|---|---|---|---|---|---|---|---|---|---|---|---|---|
| Examples | A1 | 2.3 | 1.0 | 5.0 | OK 486.6 | 13 | 3.0 | 3.5 | 0.5 | A | A | A | B |
| | A2 | 25 | 1.1 | 5.1 | OK 486.7 | 13 | 3.0 | 3.4 | 0.4 | A | A | A | A |
| | A3 | 190 | 1.0 | 5.0 | OK 486.7 | 13 | 3.0 | 3.4 | 0.4 | A | A | B | A |
| | A4 | 25 | 0.1 | 5.0 | OK 486.5 | 13 | 3.0 | 3.4 | 0.4 | A | B | A | B |
| | A5 | 26 | 1.0 | 5.1 | OK 486.7 | 13 | 3.0 | 3.4 | 0.4 | A | A | A | A |
| | A6 | 25 | 9.5 | 5.0 | OK 486.6 | 13 | 3.0 | 3.5 | 0.5 | A | A | A | A |
| | A7 | 26 | 1.1 | 0.2 | OK 486.7 | 2 | 2.7 | 5.1 | 2.4 | C | A | B | A |
| | A8 | 25 | 1.2 | 1.2 | OK 486.7 | 6 | 2.8 | 3.9 | 1.1 | B | A | B | A |
| | A9 | 25 | 1.1 | 2.0 | OK 486.6 | 9 | 2.8 | 3.8 | 1.0 | A | A | A | A |
| | A10 | 25 | 1.0 | 4.8 | OK 486.7 | 12 | 2.9 | 3.5 | 0.6 | A | A | A | A |
| | A11 | 26 | 1.2 | 10 | OK 486.6 | 10 | 3.0 | 3.4 | 0.4 | A | A | A | A |
| | A12 | 24 | 1.1 | 32 | OK 486.6 | 45 | 4.1 | 4.2 | 0.1 | A | A | A | A |
| | A13 | 25 | 1.1 | 48 | OK 486.7 | 80 | 4.3 | 4.4 | 0.1 | A | B | A | A |
| | A14 | 2.2 | 1.2 | 0.2 | OK 486.6 | 3 | 2.7 | 4.8 | 2.1 | C | B | B | B |
| | A15 | 195 | 1.2 | 46 | OK 486.7 | 85 | 4.2 | 4.5 | 0.3 | A | B | B | A |
| | A16 | 25 | 0.1 | 0.2 | OK 486.7 | 3 | 2.7 | 4.8 | 2.1 | C | B | B | B |
| | A17 | 26 | 10.0 | 45 | OK 486.7 | 90 | 4.2 | 4.6 | 0.4 | A | B | A | A |
| Comparative Examples | a1 | 25 | 1.1 | 0.2 | NG 486.2 | 4 | 2.8 | 11.5 | 8.7 | NG | A | B | A | No anodic electrolytic treatment |
| | a2 | 25 | 1.2 | 49 | NG 486.3 | 45 | 4.5 | 11.4 | 6.9 | NG | B | A | A | No anodic electrolytic-treatment |
| | a3 | 1.4 | 1.1 | 5.0 | OK 486.6 | 10 | 2.9 | 3.5 | 0.6 | A | A | A | NG | |
| | a4 | 250 | 1.1 | 5.1 | OK 486.6 | 12 | 3.2 | 3.5 | 0.3 | A | A | NG | A | |
| | a5 | 26 | 0.05 | 5.0 | OK 486.6 | 10 | 2.9 | 3.4 | 0.5 | A | NG | A | NG | |
| | a6 | 25 | 15.2 | 5.2 | NG 486.3 | 11 | 3.0 | 3.6 | 0.6 | A | NG | A | A | |
| | a7 | 25 | 2.8 | 0.1 | NG 486.2 | 2 | 3.3 | 7.7 | 4.4 | NG | A | B | A | |
| | a8 | 27 | 2.8 | 60 | OK 486.6 | 70 | 5.4 | 5.5 | 0.1 | A | NG | A | A | |
| | a9 | 25 | 1.5 | 5.1 | NG 486.3 | 10 | 2.9 | 8.5 | 5.6 | NG | B | NG | B | |
| | a10 | 25 | 1.4 | 5.5 | NG 486.2 | 12 | 2.8 | 8.7 | 5.9 | NG | B | NG | B | |
| | a11 | 26 | 1.6 | 0 | OK 486.5 | 2 | 2.7 | 7.8 | 5.1 | NG | NG | NG | B | |

As is apparent from the above Table 1, all the performances of A1 to A17 within the scope of the disclosure are favorable. On the other hand, Comparative Examples a1 to a8 show that either yellow stain resistance, lacquer adhesion, sulphide stain resistance, or corrosion resistance after coating is inferior.

In particular, as in Comparative Example a9, it can be seen that, even when the anodic electrolytic treatment was performed after forming the composite plating layers on both sides of the steel sheet and before forming the zirconium oxide layer, stable type tin oxide is not mainly formed in the zirconium oxide layer formed subsequently.

As in Comparative Example a10, it can be seen that, even when a zirconium oxide layer was formed by alternating electrolytic treatment in which the cathodic electrolytic treatment and the anodic electrolytic treatment were alternately performed, stable type tin oxide was not mainly formed on the zirconium oxide layer.

As in Comparative Example a11, when a zirconium oxide layer is not formed and the composite plating layer of the steel sheet was subjected to an anodic electrolytic treatment, a tin oxide layer is formed as a coating layer. However, it can be seen that this tin oxide layer was not a stable type tin oxide layer.

Example 2

Table 2 shows the results when the thickness of the coating layer was changed. The thickness of the coating layer was changed by changing the amount of electricity applied in the anodic electrolytic treatment.

TABLE 2

| | | Coating layer | | | | Property evaluation | | | | | | |
|---|---|---|---|---|---|---|---|---|---|---|---|---|
| | | Composite plating layer | Zr oxide Content | Tin oxide | | | yellow stain resistance | | | | | |
| | | | | | | | Color difference b* | | | | | |
| | No | Ni amount (mg/m²) | Sn amount (g/m²) | Zr amount) (mg/m²) | XPS energy peak position (eV) | Thickness (nm) | Initial | After lapse of time | Δb* | lacquer adhesion | sulphide stain resistance | Corrosion resistance after coating | Note |
| Examples | B1 | 24 | 1.1 | 5.0 | OK 486.6 | 1 | 3.1 | 4.3 | 1.2 | B | A | B | A |
| | B2 | 25 | 1.1 | 5.1 | OK 486.7 | 2 | 3.1 | 3.8 | 0.7 | B | A | A | A |
| | B3 | 24 | 1.0 | 5.0 | OK 486.7 | 4 | 3.0 | 3.5 | 0.5 | A | A | A | A |
| | B4 | 25 | 1.2 | 5.0 | OK 486.6 | 7 | 3.1 | 3.5 | 0.4 | A | A | A | A |
| | B5 | 26 | 1.2 | 5.1 | OK 486.6 | 25 | 3.4 | 3.7 | 0.3 | A | A | A | A |
| | B6 | 24 | 1.1 | 5.1 | OK 486.7 | 50 | 3.6 | 3.8 | 0.2 | A | B | A | A |
| | B7 | 26 | 1.1 | 5.2 | OK 486.7 | 98 | 4.1 | 4.2 | 0.1 | A | B | A | A |
| | B8 | 25 | 1.0 | 5.0 | OK 486.7 | 115 | 5.2 | 5.2 | 0.0 | A | B | A | B |

As is apparent from Table 2 above, it can be seen that, as the thickness of the coating layer was thicker, Δb* which was an index of yellow stain resistance tends to be small, and when the thickness of the coating layer was 4 nm or more, Δb* was particularly small.

Example 3

Table 3 shows the results when phosphorus was contained in the coating layer. These test specimens were prepared by subjecting a steel sheet on which a composite plating layer was formed to a cathodic electrolytic treatment in a cathodic electrolytic treatment liquid containing 1,400 ppm zirconium ion to which phosphate ions were added so as to be 60 ppm to 5,000 ppm.

TABLE 3

| | | Coating layer | | | | | | | |
|---|---|---|---|---|---|---|---|---|---|
| | | Composite plating layer | | Zr oxide Content | Phosphorus | | Tin oxide | | |
| | No | Ni amount (mg/m²) | Sn amount (g/m²) | (metal Zr amount) (mg/m²) | P amount (mg/m²) | P amount/ metal Zr amount | XPS energy peak position (eV) | Thickness (nm) |
| Examples | C1 | 25 | 1.1 | 5.1 | 0.1 | 0.0 | OK 486.6 | 2 |
| | C2 | 25 | 1.0 | 5.2 | 1.0 | 0.2 | OK 486.7 | 2 |
| | C3 | 25 | 1.1 | 5.0 | 5.0 | 1.0 | OK 486.7 | 2 |
| | C4 | 24 | 1.1 | 5.0 | 6.2 | 1.2 | OK 486.6 | 2 |

TABLE 3-continued

| | | Property evaluation | | | | | | |
|---|---|---|---|---|---|---|---|---|
| | | yellow stain resistance | | | | | Corrosion resistance | |
| | | Color difference b* | | | | sulphide | | |
| | No | Initial | After lapse of time | Δb* | lacquer adhesion | stain resistance | after coating | Note |
| Examples | C1 | 3.1 | 3.7 | 0.6 | A | A | A | A |
| | C2 | 3.2 | 3.4 | 0.2 | A | A | A | A |
| | C3 | 3.0 | 3.3 | 0.3 | A | A | A | A |
| | C4 | 3.0 | 4.1 | 1.1 | B | A | A | A |

As is apparent from Table 3 above, it can be seen that when phosphorus was contained in the coating layer, Δb* which was an index of yellow stain resistance tends to be small, and the test specimen having the P amount/metal Zr amount of from 0.2 to 1 had a particularly small Δb*.

Example 4

Tables 4 to 7 are the results when the formation conditions of the zirconium oxide layer (cathodic electrolytic treatment conditions) and the formation conditions of the coating layer (anodic electrolytic treatment conditions) were variously changed.

For comparison, the following test specimens were also prepared.

Comparative Examples d1 to d2

Test specimens in which, after composite plating layers were formed on both sides of the steel sheet, a zirconium oxide layer was formed and the zirconium oxide layer was not subjected to an anodic electrolytic treatment In Tables 4 to 7, properties of the zirconium oxide layer in Comparative Examples d1 to d2 (examples in which the zirconium oxide layer was not subjected to anodic electrolytic treatment) are described in the column of "Coating Layer".

TABLE 4

| | | Composite plating layer | | Formation conditions of zirconium oxide layer | | | | | |
|---|---|---|---|---|---|---|---|---|---|
| | | | | Electrolytic solution composition | | | | Cathodic electrolytic conditions | |
| | No | Ni amount (mg/m²) | Sn amount (g/m²) | Zr ion (ppm) | F ion (ppm) | Phosphate ion (ppm) | Other ions (50 ppm addition) | Current density (A/dm²) | Liquid temperature (° C.) |
| Examples | D1 | 25 | 1.1 | 1400 | 2000 | 0 | — | 0.02 | 25 |
| | D2 | 25 | 1.0 | 1400 | 2000 | 0 | — | 0.05 | 25 |
| | D3 | 25 | 1.1 | 1400 | 2000 | 0 | — | 1 | 25 |
| | D4 | 25 | 1.0 | 1400 | 2000 | 0 | — | 10 | 25 |
| | D5 | 25 | 1.1 | 1400 | 2000 | 0 | — | 50 | 25 |
| | D6 | 25 | 1.0 | 1400 | 2000 | 0 | — | 60 | 25 |
| | D7 | 26 | 1.1 | 1400 | 2000 | 0 | — | 3 | 5 |
| | D8 | 26 | 1.2 | 1400 | 2000 | 0 | — | 3 | 15 |
| | D9 | 25 | 1.0 | 1400 | 2000 | 0 | — | 3 | 50 |
| | D10 | 25 | 1.0 | 1400 | 2000 | 0 | — | 3 | 60 |
| | D11 | 25 | 1.0 | 1400 | 2000 | 0 | — | 3 | 25 |
| | D12 | 25 | 1.0 | 1400 | 2000 | 0 | — | 3 | 25 |
| | D13 | 25 | 1.0 | 1400 | 2000 | 0 | — | 3 | 25 |
| | D14 | 25 | 1.0 | 1400 | 2000 | 0 | — | 3 | 25 |
| | D15 | 25 | 1.0 | 1400 | 2000 | 0 | — | 3 | 25 |
| | D16 | 25 | 1.0 | 1400 | 2000 | 0 | — | 3 | 25 |
| | D17 | 24 | 1.0 | 1400 | 2000 | 0 | — | 3 | 25 |
| | D18 | 24 | 1.0 | 1400 | 2000 | 0 | — | 3 | 25 |
| | D19 | 25 | 1.1 | 1400 | 2000 | 0 | — | 3 | 25 |
| | D20 | 25 | 1.0 | 1400 | 2000 | 0 | — | 3 | 25 |
| | D21 | 25 | 1.0 | 1400 | 2000 | 0 | — | 3 | 25 |
| | D22 | 26 | 1.1 | 1400 | 2000 | 0 | — | 3 | 25 |
| | D23 | 25 | 1.0 | 1400 | 2000 | 0 | — | 3 | 25 |
| | D24 | 26 | 1.1 | 1400 | 2000 | 0 | — | 3 | 25 |
| | D25 | 26 | 1.1 | 1400 | 2000 | 0 | — | 3 | 25 |
| | D26 | 24 | 1.0 | 1400 | 2000 | 0 | — | 3 | 25 |
| | D27 | 26 | 1.1 | 1400 | 2000 | 0 | — | 3 | 25 |
| | D28 | 25 | 1.0 | 1400 | 2000 | 0 | — | 3 | 25 |

TABLE 4-continued

|  |  | No | Electrolyte type | Electrolyte concentration (mol/L) | pH | Current density (A/dm$^2$) | Bath temperature (° C.) |
| --- | --- | --- | --- | --- | --- | --- | --- |
|  |  |  | Electrolytic solution composition |  |  | Anodic electrolytic conditions |  |
| Examples | | D1 | Na hydrogencarbonate | 0.1 | 8 | 2 | 45 |
|  |  | D2 | Na hydrogencarbonate | 0.1 | 8 | 2 | 45 |
|  |  | D3 | Na hydrogencarbonate | 0.1 | 8 | 2 | 45 |
|  |  | D4 | Na hydrogencarbonate | 0.1 | 8 | 2 | 45 |
|  |  | D5 | Na hydrogencarbonate | 0.1 | 8 | 2 | 45 |
|  |  | D6 | Na hydrogencarbonate | 0.1 | 8 | 2 | 45 |
|  |  | D7 | Na hydrogencarbonate | 0.1 | 8 | 2 | 45 |
|  |  | D8 | Na hydrogencarbonate | 0.1 | 8 | 2 | 45 |
|  |  | D9 | Na hydrogencarbonate | 0.1 | 8 | 2 | 45 |
|  |  | D10 | Na hydrogencarbonate | 0.1 | 8 | 2 | 45 |
|  |  | D11 | Na hydrogencarbonate | 0.02 | 8 | 2 | 45 |
|  |  | D12 | Na hydrogencarbonate | 0.05 | 8 | 2 | 45 |
|  |  | D13 | Na hydrogencarbonate | 0.08 | 8 | 2 | 45 |
|  |  | D14 | Na hydrogencarbonate | 0.2 | 8 | 2 | 45 |
|  |  | D15 | Na hydrogencarbonate | 0.5 | 8 | 2 | 45 |
|  |  | D16 | Na hydrogencarbonate | 1 | 8 | 2 | 45 |
|  |  | D17 | Na hydrogencarbonate | 0.1 | 8 | 0.2 | 45 |
|  |  | D18 | Na hydrogencarbonate | 0.1 | 8 | 0.5 | 45 |
|  |  | D19 | Na hydrogencarbonate | 0.1 | 8 | 1 | 45 |
|  |  | D20 | Na hydrogencarbonate | 0.1 | 8 | 3 | 45 |
|  |  | D21 | Na hydrogencarbonate | 0.1 | 8 | 10 | 45 |
|  |  | D22 | Na hydrogencarbonate | 0.1 | 8 | 15 | 45 |
|  |  | D23 | Na hydrogencarbonate | 0.1 | 8 | 2 | 20 |
|  |  | D24 | Na hydrogencarbonate | 0.1 | 8 | 2 | 30 |
|  |  | D25 | Na hydrogencarbonate | 0.1 | 8 | 2 | 35 |
|  |  | D26 | Na hydrogencarbonate | 0.1 | 8 | 2 | 50 |
|  |  | D27 | Na hydrogencarbonate | 0.1 | 8 | 2 | 60 |
|  |  | D28 | Na hydrogencarbonate | 0.1 | 8 | 2 | 70 |

TABLE 5

|  |  | Composite plating layer | | Formation conditions of zirconium oxide layer | | | | | |
| --- | --- | --- | --- | --- | --- | --- | --- | --- | --- |
|  |  |  |  | Electrolytic solution composition | | | | Cathodic electrolytic conditions | |
|  | No | Ni amount (mg/m$^2$) | Sn amount (g/m$^2$) | Zr ion (ppm) | F ion (ppm) | Phosphate ion (ppm) | Other ions (50 ppm addition) | Current density (A/dm$^2$) | Liquid temperature (° C.) |
| Examples | D29 | 26 | 1.2 | 1400 | 2000 | 60 | — | 3 | 25 |
|  | D30 | 24 | 1.1 | 1400 | 2000 | 140 | — | 3 | 25 |
|  | D31 | 26 | 1.1 | 1400 | 2000 | 850 | — | 3 | 25 |
|  | D32 | 26 | 1.0 | 1400 | 2000 | 1600 | — | 3 | 25 |
|  | D33 | 25 | 1.2 | 1400 | 2000 | 4200 | — | 3 | 25 |
|  | D34 | 25 | 1.0 | 1400 | 2000 | 5000 | — | 3 | 25 |
|  | D35 | 25 | 1.2 | 1400 | 2000 | 850 | Fe | 3 | 25 |
|  | D36 | 25 | 1.1 | 1400 | 2000 | 850 | Ni | 3 | 25 |
|  | D37 | 26 | 1.0 | 1400 | 2000 | 850 | Co | 3 | 25 |
|  | D38 | 26 | 1.1 | 1400 | 2000 | 850 | Ca | 3 | 25 |
|  | D39 | 25 | 1.0 | 1400 | 2000 | 850 | Na | 3 | 25 |
|  | D40 | 25 | 1.0 | 1400 | 2000 | 850 | Mg | 3 | 25 |
|  | D41 | 26 | 1.2 | 1400 | 2000 | 850 | Al | 3 | 25 |
|  | D42 | 24 | 1.1 | 1400 | 2000 | 850 | Si | 3 | 25 |
|  | D43 | 25 | 1.0 | 1400 | 2000 | 850 | Fe, Cr, Ca | 3 | 25 |
|  | D44 | 24 | 1.1 | 1400 | 2000 | 0 | — | 3 | 25 |
|  | D45 | 25 | 1.0 | 1400 | 2000 | 0 | — | 3 | 25 |
|  | D46 | 26 | 1.1 | 1400 | 2000 | 0 | — | 3 | 25 |
|  | D47 | 25 | 1.2 | 1400 | 2000 | 0 | — | 3 | 25 |
|  | D48 | 24 | 1.0 | 1400 | 2000 | 0 | — | 3 | 25 |
|  | D49 | 24 | 1.0 | 1400 | 2000 | 0 | — | 3 | 25 |
|  | D50 | 24 | 1.1 | 1400 | 2000 | 0 | — | 3 | 25 |
|  | D51 | 25 | 1.0 | 1400 | 2000 | 0 | — | 3 | 25 |
|  | D52 | 26 | 1.1 | 1400 | 2000 | 0 | — | 3 | 25 |
|  | D53 | 24 | 1.0 | 1400 | 2000 | 0 | — | 3 | 25 |
|  | D54 | 25 | 1.0 | 1400 | 2000 | 0 | — | 3 | 25 |
|  | D55 | 26 | 1.0 | 1400 | 2000 | 0 | — | 3 | 25 |

TABLE 5-continued

| | | | | | | | | | | |
|---|---|---|---|---|---|---|---|---|---|---|
| Comparative | d1 | 24 | 1.0 | 1400 | 2000 | 0 | — | 3 | 25 | |
| Examples | d2 | 25 | 1.2 | 1400 | 2000 | 0 | — | 3 | 25 | |

| | | Formation conditions of coating layer | | | | |
|---|---|---|---|---|---|---|
| | | Electrolytic solution composition | | Anodic electrolytic conditions | | |
| | No | Electrolyte type | Electrolyte concentration (mol/L) | pH | Current density (A/dm$^2$) | Bath temperature (° C.) |
| Examples | D29 | Na hydrogencarbonate | 0.1 | 8 | 2 | 45 |
| | D30 | Na hydrogencarbonate | 0.1 | 8 | 2 | 45 |
| | D31 | Na hydrogencarbonate | 0.1 | 8 | 2 | 45 |
| | D32 | Na hydrogencarbonate | 0.1 | 8 | 2 | 45 |
| | D33 | Na hydrogencarbonate | 0.1 | 8 | 2 | 45 |
| | D34 | Na hydrogencarbonate | 0.1 | 8 | 2 | 45 |
| | D35 | Na hydrogencarbonate | 0.1 | 8 | 2 | 45 |
| | D36 | Na hydrogencarbonate | 0.1 | 8 | 2 | 45 |
| | D37 | Na hydrogencarbonate | 0.1 | 8 | 2 | 45 |
| | D38 | Na hydrogencarbonate | 0.1 | 8 | 2 | 45 |
| | D39 | Na hydrogencarbonate | 0.1 | 8 | 2 | 45 |
| | D40 | Na hydrogencarbonate | 0.1 | 8 | 2 | 45 |
| | D41 | Na hydrogencarbonate | 0.1 | 8 | 2 | 45 |
| | D42 | Na hydrogencarbonate | 0.1 | 8 | 2 | 45 |
| | D43 | Na hydrogencarbonate | 0.1 | 8 | 2 | 45 |
| | D44 | Na carbonate | 0.1 | 11 | 2 | 45 |
| | D45 | Na carbonate | 0.1 | 11 | 2 | 45 |
| | D46 | Na diphosphate | 0.1 | 10 | 2 | 45 |
| | D47 | Na diphosphate | 0.1 | 10 | 2 | 45 |
| | D48 | Tri-Na citrate | 0.1 | 8 | 2 | 45 |
| | D49 | Tri-Na citrate | 0.1 | 8 | 2 | 45 |
| | D50 | NH$_3$ tartrate | 0.1 | 6 | 2 | 45 |
| | D51 | NH$_3$ tartrate | 0.1 | 6 | 2 | 45 |
| | D52 | Na sulfate | 0.1 | 7 | 2 | 45 |
| | D53 | Na sulfate | 0.1 | 7 | 2 | 45 |
| | D54 | Phosphoric acid | 0.1 | 2 | 2 | 45 |
| | D55 | Phosphoric acid | 0.1 | 2 | 2 | 45 |
| Comparative | d1 | — | — | — | — | — |
| Examples | d2 | — | — | — | — | — |

TABLE 6

| | | Zirconium oxide | | | Coating layer | | Evaluation results | | | | | |
|---|---|---|---|---|---|---|---|---|---|---|---|---|
| | | Zr oxide | Phosphorus | | | Tin oxide | | Color difference b* | | | | |
| | No | Content (metal Zr amount) (mg/m$^2$) | P amount (mg/m$^2$) | P amount/ metal Zr amount | XPS energy peak position (eV) | Thickness (nm) | Initial | After lapse of time | Δb* | yellow stain resistance | lacquer adhesion | sulphide stain resistance | Corrosion resistance after coating |
| Examples | D1 | 5 | 0.0 | 0.0 | OK | 486.5 | 4 | 2.9 | 5.1 | 2.2 | C | A | B | B |
| | D2 | 5 | 0.0 | 0.0 | OK | 486.7 | 4 | 2.9 | 4.5 | 1.6 | B | A | B | A |
| | D3 | 5 | 0.0 | 0.0 | OK | 486.7 | 4 | 3.1 | 3.5 | 0.4 | A | A | A | A |
| | D4 | 5 | 0.0 | 0.0 | OK | 486.7 | 4 | 3.2 | 3.4 | 0.2 | A | A | A | A |
| | D5 | 10 | 0.0 | 0.0 | OK | 486.6 | 4 | 3.5 | 4.1 | 0.6 | A | B | A | A |
| | D6 | 10 | 0.0 | 0.0 | OK | 486.7 | 4 | 3.7 | 4.1 | 0.4 | A | B | B | A |
| | D7 | 5 | 0.0 | 0.0 | OK | 486.7 | 4 | 3.2 | 3.4 | 0.2 | A | A | A | B |
| | D8 | 5 | 0.0 | 0.0 | OK | 486.6 | 4 | 3.2 | 3.5 | 0.3 | A | A | A | A |
| | D9 | 5 | 0.0 | 0.0 | OK | 486.7 | 4 | 3.2 | 4.0 | 0.8 | A | A | A | A |
| | D10 | 5 | 0.0 | 0.0 | OK | 486.7 | 4 | 3.3 | 4.1 | 0.8 | A | B | B | B |
| | D11 | 5 | 0.0 | 0.0 | OK | 486.6 | 4 | 3.1 | 3.9 | 0.8 | A | A | A | B |
| | D12 | 5 | 0.0 | 0.0 | OK | 496.7 | 4 | 3.0 | 3.8 | 0.8 | A | A | A | A |
| | D13 | 5 | 0.0 | 0.0 | OK | 486.7 | 4 | 3.1 | 3.4 | 0.3 | A | A | A | A |
| | D14 | 5 | 0.0 | 0.0 | OK | 486.7 | 4 | 3.2 | 3.5 | 0.3 | A | A | A | A |
| | D15 | 5 | 0.0 | 0.0 | OK | 486.6 | 4 | 3.2 | 3.5 | 0.3 | A | A | A | A |
| | D16 | 5 | 0.0 | 0.0 | OK | 486.6 | 4 | 3.1 | 3.4 | 0.3 | A | A | A | A |
| | D17 | 5 | 0.0 | 0.0 | OK | 486.7 | 4 | 3.1 | 3.4 | 0.3 | B | A | A | B |
| | D18 | 5 | 0.0 | 0.0 | OK | 486.7 | 4 | 3.3 | 3.5 | 0.2 | A | A | A | B |
| | D19 | 5 | 0.0 | 0.0 | OK | 486.7 | 4 | 3.2 | 3.3 | 0.1 | A | A | A | A |
| | D20 | 5 | 0.0 | 0.0 | OK | 486.7 | 4 | 3.2 | 3.7 | 0.5 | A | A | A | A |
| | D21 | 5 | 0.0 | 0.0 | OK | 486.6 | 4 | 3.0 | 4.3 | 1.3 | B | A | A | A |
| | D22 | 5 | 0.0 | 0.0 | OK | 486.6 | 4 | 3.1 | 5.6 | 2.5 | C | A | B | B |
| | D23 | 5 | 0.0 | 0.0 | OK | 486.6 | 4 | 3.0 | 5.1 | 2.1 | C | A | A | A |

TABLE 6-continued

| | | Zirconium oxide | | Coating layer | | | Evaluation results | | | | | | |
|---|---|---|---|---|---|---|---|---|---|---|---|---|---|
| | | Zr oxide | | | Tin oxide | | | | | | | | |
| | | Content | Phosphorus | | | | Color difference b* | | | | | | |
| | No | (metal Zr amount) (mg/m$^2$) | P amount (mg/m$^2$) | P amount/ metal Zr amount | XPS energy peak position (eV) | Thickness (nm) | Initial | After lapse of time | Δb* | yellow stain resistance | lacquer adhesion | sulphide stain resistance | Corrosion resistance after coating |
| | D24 | 5 | 0.0 | 0.0 | OK 486.7 | 4 | 3.0 | 4.3 | 1.3 | B | A | A | A |
| | D25 | 5 | 0.0 | 0.0 | OK 486.7 | 4 | 3.3 | 3.5 | 0.2 | A | A | A | A |
| | D26 | 5 | 0.0 | 0.0 | OK 486.7 | 4 | 3.3 | 3.4 | 0.1 | A | A | A | A |
| | D27 | 5 | 0.0 | 0.0 | OK 486.7 | 4 | 3.0 | 4.4 | 1.4 | B | A | A | A |
| | D28 | 5 | 0.0 | 0.0 | OK 486.7 | 4 | 3.1 | 5.6 | 2.5 | C | A | A | A |

TABLE 7

| | | Zirconium oxide layer | | | Coating layer | | | Evaluation results | | | | | | |
|---|---|---|---|---|---|---|---|---|---|---|---|---|---|---|
| | | Zr oxide | | | | Tin oxide | | | | | | | | |
| | | Content | Phosphorus | | | | | Color difference b* | | | | | | Corrosion |
| | No | (metal Zr amount) (mg/m$^2$) | P amount (mg/m$^2$) | P amount/ metal Zr amount | XPS energy peak position (eV) | Thickness (nm) | Initial | After lapse of time | Δb* | yellow stain resistance | lacquer adhesion | sulphide stain resistance | resistance after coating |
| Examples | D29 | 5 | 0.5 | 0.1 | OK 386.5 | 4 | 3.2 | 5.4 | 2.2 | C | A | A | A |
| | D30 | 5 | 1.5 | 0.3 | OK 486.7 | 4 | 3.2 | 4.5 | 1.3 | B | A | A | A |
| | D31 | 5 | 3.0 | 0.7 | OK 486.7 | 4 | 3.1 | 3.4 | 0.3 | A | A | A | A |
| | D32 | 5 | 4.0 | 0.8 | OK 486.7 | 4 | 3.2 | 3.4 | 0.2 | A | A | A | A |
| | D33 | 5 | 5.0 | 1.0 | OK 486.7 | 4 | 3.0 | 4.3 | 1.3 | B | A | A | A |
| | D34 | 5 | 6.0 | 1.3 | OK 486.7 | 4 | 3.0 | 5.5 | 2.5 | C | A | A | A |
| | D35 | 5 | 0.0 | 0.0 | OK 486.7 | 4 | 3.0 | 3.2 | 0.2 | A | A | A | A |
| | D36 | 5 | 1.3 | 0.3 | OK 486.6 | 4 | 3.2 | 3.6 | 0.4 | A | A | A | A |
| | D37 | 5 | 1.3 | 0.3 | OK 486.7 | 4 | 3.2 | 3.4 | 0.2 | A | A | A | A |
| | D38 | 5 | 1.3 | 0.3 | OK 486.7 | 4 | 3.1 | 3.4 | 0.3 | A | A | A | A |
| | D39 | 5 | 1.3 | 0.3 | OK 486.6 | 4 | 3.2 | 3.4 | 0.2 | A | A | A | A |
| | D40 | 5 | 1.3 | 0.3 | OK 486.7 | 4 | 3.0 | 3.4 | 0.4 | A | A | A | A |
| | D41 | 5 | 1.3 | 0.3 | OK 486.6 | 4 | 3.1 | 3.4 | 0.3 | A | A | A | A |
| | D42 | 5 | 1.3 | 0.3 | OK 486.7 | 4 | 3.2 | 3.4 | 0.2 | A | A | A | A |
| | D43 | 5 | 1.3 | 0.3 | OK 486.7 | 4 | 3.1 | 3.3 | 0.2 | A | A | A | A |
| | D44 | 5 | 0.6 | 0.1 | OK 486.6 | 4 | 3.3 | 3.9 | 0.6 | A | A | A | A |
| | D45 | 10 | 3.0 | 0.3 | OK 486.6 | 4 | 3.2 | 3.6 | 0.4 | A | A | A | A |
| | D46 | 5 | 0.6 | 0.1 | OK 486.7 | 4 | 3.3 | 3.7 | 0.4 | A | A | A | A |
| | D47 | 10 | 3.0 | 0.3 | OK 486.7 | 4 | 3.3 | 3.4 | 0.1 | A | A | A | A |
| | D48 | 5 | 0.6 | 0.1 | OK 486.7 | 4 | 3.2 | 3.6 | 0.4 | A | A | A | A |
| | D49 | 10 | 3.0 | 0.3 | OK 486.6 | 4 | 3.3 | 3.5 | 0.2 | A | A | A | A |
| | D50 | 5 | 0.6 | 0.1 | OK 486.7 | 4 | 3.0 | 3.5 | 0.5 | A | A | A | A |
| | D51 | 10 | 3.0 | 0.3 | OK 486.7 | 4 | 3.2 | 3.5 | 0.3 | A | A | A | A |
| | D52 | 5 | 0.6 | 0.1 | OK 486.6 | 4 | 3.3 | 3.6 | 0.3 | A | A | A | A |
| | D53 | 10 | 3.0 | 0.3 | OK 486.7 | 4 | 3.2 | 3.5 | 0.3 | A | A | A | A |
| | D54 | 5 | 0.6 | 0.1 | OK 486.7 | 4 | 3.1 | 3.4 | 0.3 | A | B | A | A |
| | D55 | 10 | 3.0 | 0.3 | OK 486.7 | 4 | 3.2 | 3.6 | 0.4 | A | B | A | A |
| Comparative Examples | d1 | 5 | 0.0 | 0.0 | NG 486.4 | 12 | 2.9 | 14.4 | 11.5 | NG | A | A | A |
| | d2 | 50 | 0.0 | 0.0 | NG 486.3 | 12 | 4.6 | 13.1 | 8.5 | NG | B | A | A |

As is apparent from Tables 4 to 7, it can be seen that the performance of the test specimen prepared according to the conditions defined in the disclosure were all preferable.

Although the disclosure has been described in detail above, the disclosure is not limited to such Examples. It is obvious that various changes or modifications can be reached at by those having ordinary knowledge in the technical field to which the disclosure pertains within the scope of the technical idea described in the claims, and it is understood that these are naturally also within the technical scope of the disclosure.

INDUSTRIAL APPLICABILITY

As described above, the Sn-based alloy plated steel sheet of the disclosure is excellent in yellow stain resistance, lacquer adhesion, and sulphide stain resistance without requiring a conventional chromate treatment, and therefore, such a sheet can be widely used for food cans, beverage cans, and the like as an environmentally friendly can material, which has an extremely high industrial utility value.

The disclosure of Japanese Patent Application No. 2016-103381 is hereby incorporated by reference in its entirety.

All the literature, patent applications, and technical standards cited herein are also herein incorporated to the same extent as provided for specifically and severally with respect to an individual literature, patent application, and technical standard to the effect that the same should be so incorporated by reference.

The invention claimed is:

1. An Sn-based alloy plated steel sheet comprising:
a steel sheet;
a composite plating layer formed on at least one side of the steel sheet and including an Fe—Ni—Sn alloy layer and an island-shaped Sn layer located on the Fe—Ni—Sn alloy layer; and
a coating layer formed on the surface of the composite plating layer and containing zirconium oxide and tin oxide,
wherein the composite plating layer contains, from 2 mg/m$^2$ to 200 mg/m$^2$ of Ni in terms of metal Ni amount and from 0.1 g/m$^2$ to 10 g/m$^2$ of Sn in terms of metal Sn amount,
a content of the zirconium oxide in the coating layer is from 0.2 mg/m$^2$ to 50 mg/m$^2$ in terms of metal Zr amount, and
a peak position of binding energy of Sn3d$_{5/2}$ according to X-ray photoelectron spectroscopy of the tin oxide in the coating layer is 1.6 eV or higher than a peak position of binding energy of the metal Sn.

2. The Sn-based alloy plated steel sheet according to claim 1, wherein a thickness of the coating layer is from 2 nm to 100 nm.

3. The Sn-based alloy plated steel sheet according to claim 1, wherein the coating layer further contains phosphorus and a P amount/a. metal Zr amount is from 0.2 to 1 in terms of mass ratio per unit area.

4. The Sn-based alloy plated steel sheet according to claim 2, wherein the coating layer further contains phosphorus and a P amount/a metal Zr amount is from 0.2 to 1 in terms of mass ratio per unit area.

* * * * *